United States Patent
Farrar et al.

(10) Patent No.: US 10,114,402 B2
(45) Date of Patent: Oct. 30, 2018

(54) TOUCH-SENSITIVE CONTROL

(71) Applicant: AMS Neve Ltd., Burnley (GB)

(72) Inventors: Wayne Farrar, Droylsden (GB); Stephen Martin Wyatt, Burnley (GB); Robin Andrew Porter, Saffron Walden (GB); Christopher Bloor, Baxenden (GB)

(73) Assignee: AMS Neve Ltd., Burnley (GB)

( * ) Notice: Subject to any disclaimer, the term of this patent is extended or adjusted under 35 U.S.C. 154(b) by 0 days.

(21) Appl. No.: 14/905,243

(22) PCT Filed: Jul. 18, 2014

(86) PCT No.: PCT/GB2014/052214
§ 371 (c)(1),
(2) Date: Jan. 14, 2016

(87) PCT Pub. No.: WO2015/008092
PCT Pub. Date: Jan. 22, 2015

(65) Prior Publication Data
US 2016/0170436 A1    Jun. 16, 2016

(30) Foreign Application Priority Data

Jul. 19, 2013   (GB) .................................. 1312978.8

(51) Int. Cl.
*G06F 3/041* (2006.01)
*G05G 1/10* (2006.01)
(Continued)

(52) U.S. Cl.
CPC ............... *G05G 1/105* (2013.01); *G01D 5/30* (2013.01); *G05G 1/015* (2013.01); *G05G 1/08* (2013.01);
(Continued)

(58) Field of Classification Search
CPC .. G06F 3/0202; G06F 3/0354; G06F 3/03546; G06F 3/03547; G06F 3/02; G06F 3/16
See application file for complete search history.

(56) References Cited

U.S. PATENT DOCUMENTS 5,450,075 A * 9/1995 Waddington ............. G05G 1/10
340/870.28
6,438,241 B1   8/2002 Silfvast et al.
(Continued)

FOREIGN PATENT DOCUMENTS

DE   10 2007 035564 A1   1/2001
DE   10 2010 017111 A1   5/2011
(Continued)

OTHER PUBLICATIONS

Nickitas-Etienne, Athina, "International Preliminary Report on Patentability for PCT/GB2014/052214," International Bureau of WIPO, dated Jan. 19, 2016.

*Primary Examiner* — Vijay Shankar
(74) *Attorney, Agent, or Firm* — Florek & Endres PLLC

(57) ABSTRACT

The invention provides a rotary or touch-sensitive control comprising a first rotatable and/or touch-sensitive body comprising means for displaying information relating to a parameter controlled by the first body, and a second rotatable and/or touch-sensitive body formed around the first rotatable body comprising means for displaying information relating to a parameter controlled by the second rotatable body.

9 Claims, 7 Drawing Sheets

(51) Int. Cl.
  *G05G 1/015*  (2008.04)
  *G05G 1/08*  (2006.01)
  *H04H 60/04*  (2008.01)
  *G01D 5/30*  (2006.01)
  *G06F 3/02*  (2006.01)
  *G06F 3/0354*  (2013.01)
  *G06F 3/16*  (2006.01)
  *H01H 19/14*  (2006.01)

(52) U.S. Cl.
  CPC ........ G06F 3/0202 (2013.01); G06F 3/03547 (2013.01); G06F 3/165 (2013.01); H04H 60/04 (2013.01); *H01H 2019/143* (2013.01); *H01H 2219/0621* (2013.01)

(56) References Cited

U.S. PATENT DOCUMENTS

| | | | |
|---|---|---|---|
| 7,084,859 B1* | 8/2006 | Pryor | G01C 21/3664 345/156 |
| 7,489,303 B1 | 2/2009 | Pryor | |
| 7,698,009 B2* | 4/2010 | Cotey | G06F 3/165 381/119 |
| 8,383,967 B2* | 2/2013 | Kindikeri | G05G 1/015 200/11 R |
| 9,513,744 B2* | 12/2016 | Pryor | G01C 21/3664 |
| 2003/0019733 A1 | 1/2003 | Sato | |
| 2006/0207867 A1 | 9/2006 | Waddington | |
| 2007/0100482 A1* | 5/2007 | Cotey | H04H 60/04 700/94 |
| 2007/0271528 A1* | 11/2007 | Park | G06F 3/0482 715/810 |
| 2008/0211779 A1* | 9/2008 | Pryor | G01C 21/3664 345/173 |
| 2010/0182137 A1* | 7/2010 | Pryor | G01C 21/3664 340/425.5 |
| 2011/0030609 A1 | 2/2011 | Kindikeri | |
| 2011/0037725 A1* | 2/2011 | Pryor | G01C 21/3664 345/174 |

FOREIGN PATENT DOCUMENTS

| | | |
|---|---|---|
| GB | 2361292 A | 10/2001 |
| JP | S5346548 U | 4/1978 |
| JP | H01105230 U | 7/1989 |

* cited by examiner

TOUCH-SENSITIVE CONTROL

TECHNICAL FIELD OF THE INVENTION

The present invention relates to rotary or touch-sensitive controls, apparatus comprising rotary or touch-sensitive controls and methods of displaying parameter changes using rotary or touch-sensitive controls.

BACKGROUND TO THE INVENTION

In many types of electronic apparatus, such as audio apparatus and audio visual apparatus, the apparatus is provided with rotary controls, which may be accommodated in a relatively small area. For apparatus such as music mixing desks there can be in excess of a thousand rotary controls accommodated in a very small area. In known music mixing desks, bar graphs, either horizontally or vertically arranged, are associated with rotary controls to display information on various parameters, the display changing upon the position of the controls. These bar graphs display the information adequately but their horizontal or vertical extent imposes limitations on the density of controls which may be incorporated into the mixing desk and therefore, for a given capacity increases the size of the desk. As these desks are usually controlled by a single person this is in an important consideration.

Relatively recently, rotary controls have been developed in which the rotary control itself, consisting of a single knob or body, incorporates light transmitting elements or light emitting elements, which elements display information relating to a parameter controlled by the knob or body, dependent on the position of the rotary control. In this way, the rotary control itself includes the information display, and separate horizontally or vertically arranged bar graphs are not required. This type of rotary control frees up some space on the apparatus, which space may then be used to incorporate further rotary controls, or other components. However, in apparatus such as music mixing desks where there are a large number of rotary controls, even the incorporation of rotary controls which have integral parameter information displays can be unwieldy. Each rotary control which adjusts a specific parameter needs to be memorised by an operator, and complementary controls, which may adjust linked or cooperating parameters may be spaced apart, which can lead to errors in control of those parameters even if every control is memorised by the operator.

It would therefore be advantageous if rotary controls could be manufactured, such that multiple parameters can be controlled by a single rotary control, whilst still retaining the visual display information corresponding to each parameter.

It would also be advantageous if controls could be manufactured in which multiple parameters could be controlled by a single touch-sensitive control, whilst still retaining the visual display information corresponding to each parameter.

It is therefore an aim of preferred embodiments of the invention to overcome or mitigate at least one problem of the prior art whether disclosed herein or not.

SUMMARY OF THE INVENTION

According to a first aspect of the invention there is provided a rotary control comprising a first rotatable body comprising means for displaying information relating to a parameter controlled by the first body, and a second rotatable body formed around the first rotatable body comprising means for displaying information relating to a parameter controlled by the second body.

In some embodiments the first rotatable body comprises a substantially cylindrical body and the second rotatable body comprises a substantially annular body formed around the circumference of the cylindrical first body. The first body may comprise a central, axially extending bore to accommodate a spindle. The second body may comprise an annular recess to accommodate an annular retaining sleeve.

The means for displaying information relating to a parameter controlled by the first or second body may be means formed within the first or second body. The means for displaying information relating to a parameter controlled by the first or second body may comprise a visual display element. The visual display element may comprise a light transmitting element, a light emitting element, or the like for example. The light emitting element may comprise a light emitting diode (LED), for example. There may be a plurality of visual display elements, which may be disposed around the periphery of the first and/or second rotatable bodies and may be disposed around the axis of the rotation of the first and/or second bodies. In other embodiments the visual display elements may comprise a matrix of information display elements, which elements may be adjacent and abutting, or spaced apart.

The visual display elements may be connected to circuitry or other electrical means which enables selected elements to be activated to represent certain conditions associates with a parameter controlled by the first and/or second body. The circuitry or electrical means may feed information to the visual display elements in response to rotation of the first and/or second rotatable bodies, in order for the visual display elements to display information corresponding to the degree of rotation of the first and/or second bodies.

The means for displaying information relating to a parameter controlled by the first or second body may comprise a plurality of channels for the transmission of light signals connected to a visual display element at one end thereof. The plurality of channels may be disposed around the periphery of the first or second body and may be disposed around the axis of rotation of the first or second body. The channels may comprise passages bored through the first or second body segments of the first or second body itself, slots in the surface of the first or second body, or any other suitable configuration. The channels may comprise optic fibres and may consist of optic fibres in some embodiments. In some embodiments the channels are formed by waveguides each of which comprises a bundle of optic fibres. The optic fibres may comprise an LED at one end thereof.

In some embodiments there is provided a plurality of channels through the first and/or second rotatable bodies for the transmission of light signals which are optically connected to an array of LEDs. In such embodiments there may be no direct connection between the first and/or second rotatable bodies and the array of LEDs. Rather, the or each rotatable body may be moveable with respect to the array of LEDs. In this way, light from any LED present in the array can be transmitted along more than one of the channels. In embodiments wherein the plurality of channels are disposed around the periphery of the first and/or second body, the array of LEDs may comprise a ring of LEDs corresponding to the configuration of the channels.

The channels may each comprise a visual display element as described above. Each channel may comprise a light emitting element which emits light of the same wavelength(s) or colour(s) or each channel or sub-set of channels may comprise light emitting elements of different wavelength(s), colours(s), shade(s) or hue(s).

The visual display elements may be connected to an information encoder connected to a reader, which together process information corresponding to the rotation of the first and/or second bodies and relays said information to circuitry or other electronics to activate change in the parameter controlled by the first and/or second body. The encoder and reader may also be connected to a display controller which effects the control of the visual display elements during rotation of the first and/or second bodies.

Each encoder may be an optical encoder arranged to cooperate with an optical reader, and may be in the form of a code strip or body disposed around the first and/or second bodies. The code strip or body may comprise a sheet adhered to the first and/or second body or may comprise an engraved or embossed strip or body. In other embodiments the encoder may comprise a mechanical encoder arranged to cooperate with a reader comprising a gear or mesh located on first and/or second rotatable body.

The or each encoder and reader may be located on the outside of the first and/or second rotatable bodies, or alternatively may be located within the first and/or second rotatable bodies, so that they are not visible during normal use of the rotary control.

The encoder or reader corresponding to the first rotatable body may be located on an inside surface of the first body, such as within the central, axially extending bore. In such embodiments the other of the encoder or reader may be located on a surface of a spindle located within the bore. In some embodiments the encoder or reader corresponding to the second rotatable body may be located on an inside surface of the body, and the other of the encoder or reader may be located on a surface adjacent thereto such as on a surface of the annular retaining sleeve, for example.

In some embodiments the encoder and reader for the first rotatable body are located within the first body so that they are not visible during normal use of the rotary control; the encoder corresponding to the second rotatable body is located on an outside surface of the second body; and the reader corresponding to the second rotatable body is located adjacent to the surface of the second body comprising the encoder.

In some embodiments a region of at least one of the rotatable bodies is touch sensitive. The touch sensitive region may comprise at least part of an outer surface of the or each rotatable body and may comprise substantially the whole of an outer surface of the or each body.

The touch sensitive region may comprise a conductive material and may be responsive upon contact with a further conductive material such as a finger, for example. In other embodiments the touch sensitive region may be responsive to the application of pressure to the region.

The operation of the visual display elements may be controlled by the touch sensitive region. For example, the visual display elements may only be activated in response to a touch or touches of the region.

In some embodiments the parameter/s corresponding to the rotatable bodies may be controlled by the operation of the sensitive region and may be controllable in response to a touch or touches of the touch sensitive region. For example, in embodiments wherein the rotatable bodies are substantially cylindrical, the touch sensitive region may be disposed circumferentially about the body, and may be responsive to a user imitating the action of rotating the body by running a finger or fingers along the region. The touch sensitive control of the parameter/s may be utilised alongside the rotational control of the parameter/s.

The or each touch sensitive region may be used to control the parameter and/or the visual display elements corresponding to the rotatable body on which the touch sensitive region is located. For example, there may be provided a touch sensitive region on each rotatable body, each touch sensitive region being operable to control the parameter and/or visual display elements corresponding to the corresponding body.

In other embodiments there is provided a single touch sensitive region on the rotary control which is operable to control the parameter/s and/or visual display elements corresponding to each rotatable body. Such embodiments may be utilised where the parameters and/or visual display elements are to be turned on/off at the same time, or where they are to be adjusted by the same extent at the same time.

The first and second rotatable bodies may comprise means formed within the body for displaying information relating to different parameters, for example volume and stereo gain.

In other embodiments the first or second rotatable bodies may comprise means formed with the body for displaying information relating to the same parameter controlled by the first and second rotatable bodies, for example of the first body controls coarse volume and the second body fine volume.

In some embodiments the rotary control may further comprise a means for storing the parameter settings which may involve storing the position of each rotatable body. The stored parameter settings may subsequently be recalled without a user having to rotate each rotatable body or contact the touch sensitive region to input each parameter setting individually. In such embodiments, the rotary control may further comprise a means to reactivate the corresponding visual display elements when recalling the stored parameter settings.

The rotary control may comprise a means for storing a series of parameter settings. The series of parameter settings may correspond to specific points, or periods of time along a timeline. The timeline may correspond to a music track or a film, for example, where different parameter settings are required at different points in time. In such embodiments the rotary control may comprise a means for automatically recalling the series of stored parameters such that they are synchronised with the timeline.

The means for storing the parameter settings may comprise a microprocessor in communication with a remote computer. In such embodiments, the controllable parameters and/or the operation of the visual display elements may be controlled by the microprocessor, which is operable to receive information relating to the rotation of each rotatable body and/or the activation of a touch sensitive region. The microprocessor may further be operable to control the rotation of each rotatable body and/or the operation of the visual display elements and may do so upon receipt of instructions from the remote computer.

In further embodiments the storing and recall process may be fully automated by the microprocessor and computer, for example, a user may input desired parameter settings directly to the computer and without the need to use the rotatable bodies of the rotary control. The computer may subsequently relay the user inputs to the microprocessor which controls the parameters through control of the rotation of the rotatable bodies and/or the operation of the visual display elements. In some embodiments the rotatable bodies may be motorised. The microprocessor may control rotation of the rotatable bodies via motors controlling the bodies.

In embodiments wherein there is provided a computer and microprocessor to store, recall and optionally automate the parameter settings, the rotatable bodies may be operable in use to override the recalled settings. For example, a user may be able to alter a pre-stored parameter during recall and/or automation by rotating the rotatable bodies. In some embodiments activation of the touch sensitive region or regions may be used to override pre-stored, recalled and/or automated parameter settings.

According to a second aspect of the invention there is provided an apparatus comprising the rotary control of the first aspect of the invention.

The apparatus may be an audio apparatus, such as a music mixing desk, a graphic equalizer or the like, or may be an audio visual apparatus such as a monitor, display screen, television or the like, for example. The apparatus may comprise a plurality of rotary controls.

The rotary control of the invention reduces the space required for provision of controls of an apparatus by ensuring efficient use of space. Furthermore the rotary control of the invention enables complementary parameters to be controlled from a single control, whilst giving the operator an immediate and localised view of the state of multiple parameters adjacent to each other, which reduces the risk that an operator mis-reads information, which may otherwise be the case where parameter information is displayed across distantly remote locations on an apparatus.

According to a third aspect of the invention there is provided a method of displaying information relating to one or more parameters, the method comprising
a) providing a rotary control of the first aspect of the invention;
b) rotating the first rotatable body to display information on a first parameter; and
c) rotating the second rotatable body to display information on a second parameter.

The method may additionally comprise contacting a touch sensitive region on at least one of the rotatable bodies, said contact resulting in the display of information on the corresponding parameter.

The first and second parameters may be the same parameter, but on different scales, or may be different parameters.

The parameter may be an audio parameter independently selected from volume, stereo volume, mono gain, stereo gain, frequency cut/boost, frequency selection, gain make up, compression ratio, compression threshold, compression release, compression attack, gate hysteresis, gate threshold, gate release, gate attack, gate depth, reverb level, echo level, reverb time, echo delay and dry/wet blend.

According to a fourth aspect of the invention there is provided a control comprising a first touch-sensitive body comprising means for displaying information relating to a parameter controlled be the first body, and a second touch-sensitive body formed around the first touch-sensitive body comprising means for displaying information relating to a second parameter controlled by the second body.

The first and second parameters may be as described for the first to third aspects of the invention. In some embodiments the first body and second body are non-rotatable.

The first and second touch-sensitive bodies may include means for displaying information relating to parameters controlled by the first or second bodies, as described for the first aspect of the invention, which may comprise visual display elements such as a light transmitting element, a light emitting element, or the like.

DETAILED DESCRIPTION OF THE INVENTION

In order that the invention may be more clearly understood, embodiments thereof will now be described, by way of example only, with reference to the accompanying drawings of which:

Figure 1:
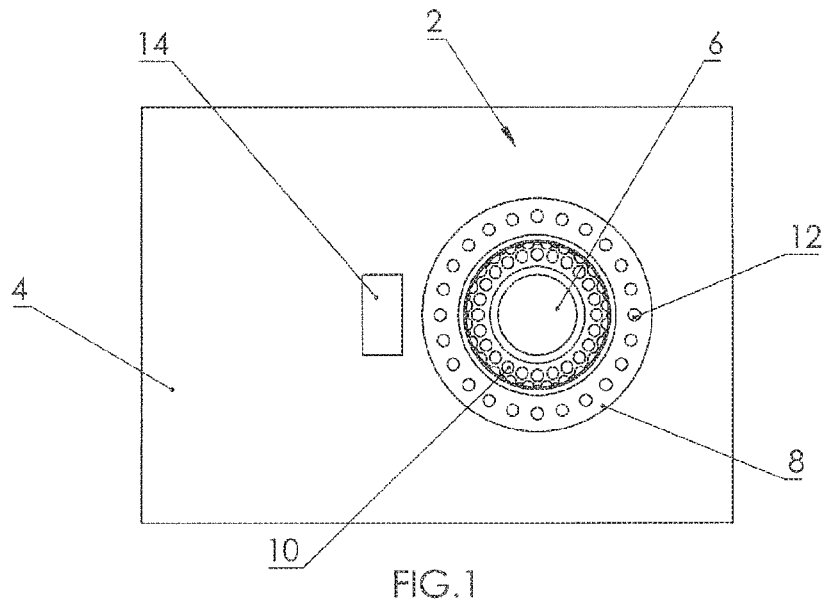
FIG. 1 illustrates a top-down view of a first embodiment of a rotary control of the invention located on a surface of an apparatus.

Referring firstly to FIGS. 1 to 4, a first embodiment of a rotary control (2) of the invention mounted on a surface (4) comprises a first rotatable body in the form of cylindrical knob (6) which includes a plurality of channels (10) disposed around the periphery of the cylindrical knob (6). The channels (10) include optic fibres, which are provided at one end with a light emitting diode (not shown). The channels (10) are formed as cut-out channels in the body of the cylindrical knob (6).

Formed around the cylindrical knob (6) is a second rotatable body in the form of an annular knob (8) though which extend a plurality of channels (12), again comprising optic fibres running therethrough, and connected to a light emitting diode at one end thereof.

The rotary control (2) is connected to a surface (4) of a music mixing desk (not shown), and the cylindrical knob (6) and annular knob (8) control parameters associated with the music mixing desk, such as volume, stereo gain, volume level filter frequency, filter cut, filter boost or frequency gain for example. In this embodiment the two knobs (6), (8) control different parameters.

Figure 2:
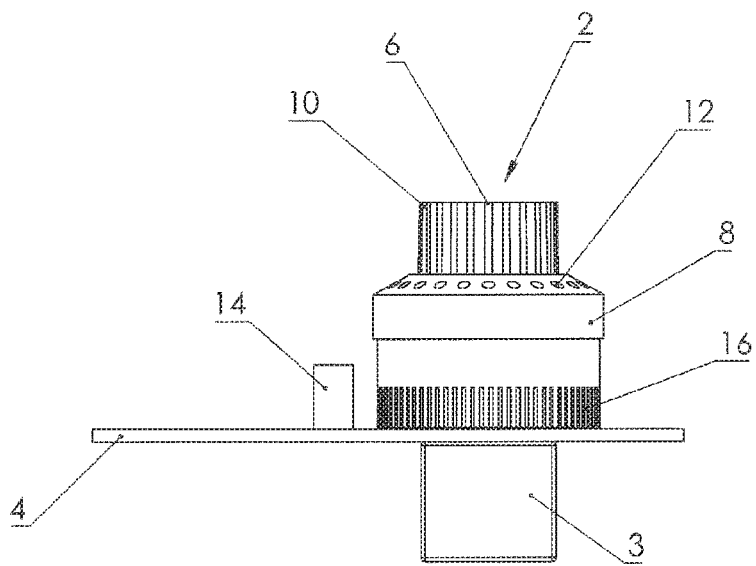
FIG. 2 illustrates a side view of the embodiment shown in FIG. 1.
Figure 3:
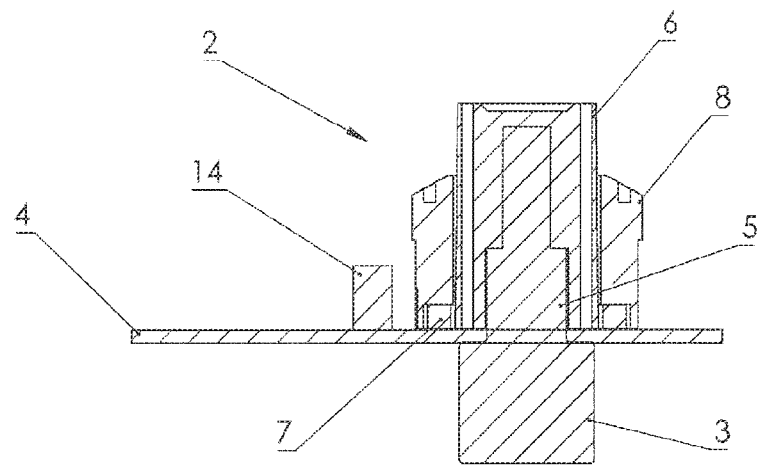
FIG. 3 illustrates a cross sectional view of the side view of FIG. 2.
Figure 4:
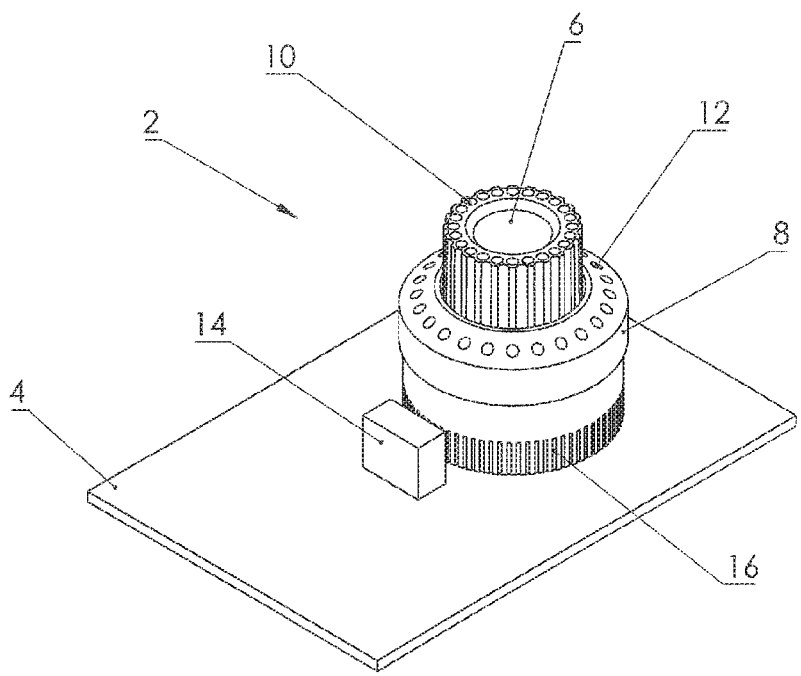
FIG. 4 illustrates a perspective view of the embodiment of the rotary control of the invention shown in FIGS. 1 and 2.
Figure 5:
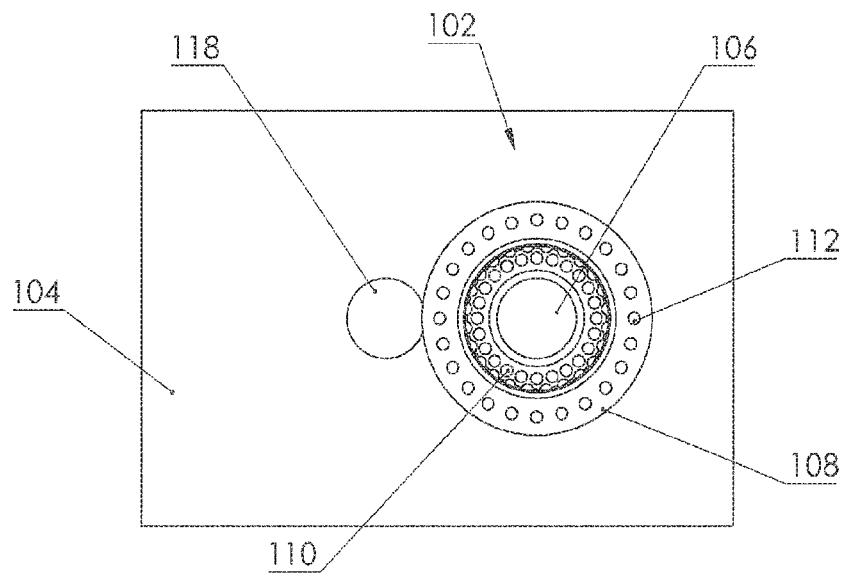
FIG. 5 illustrates a top down view of a second embodiment of a rotary control of the invention.
Figure 6:
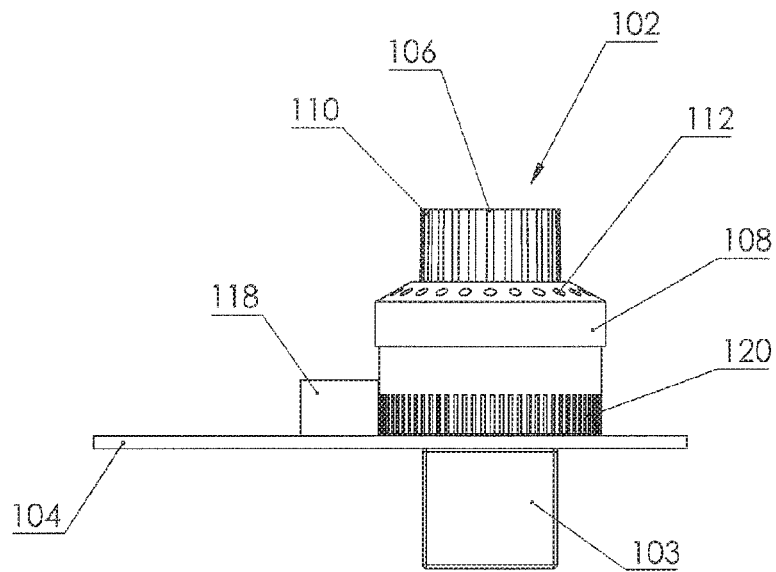
FIG. 6 illustrates a side view of the embodiment of the rotary control shown in FIG. 5.
Figure 7:
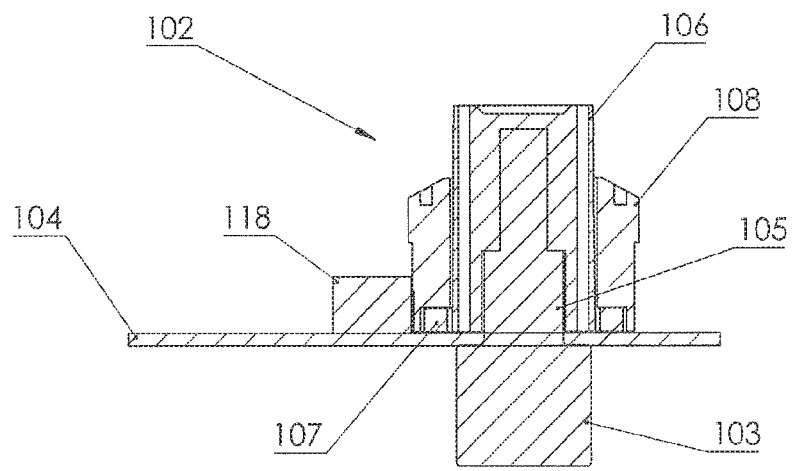
FIG. 7 illustrates a cross sectional view of the side view shown in FIG. 6.
Figure 8:
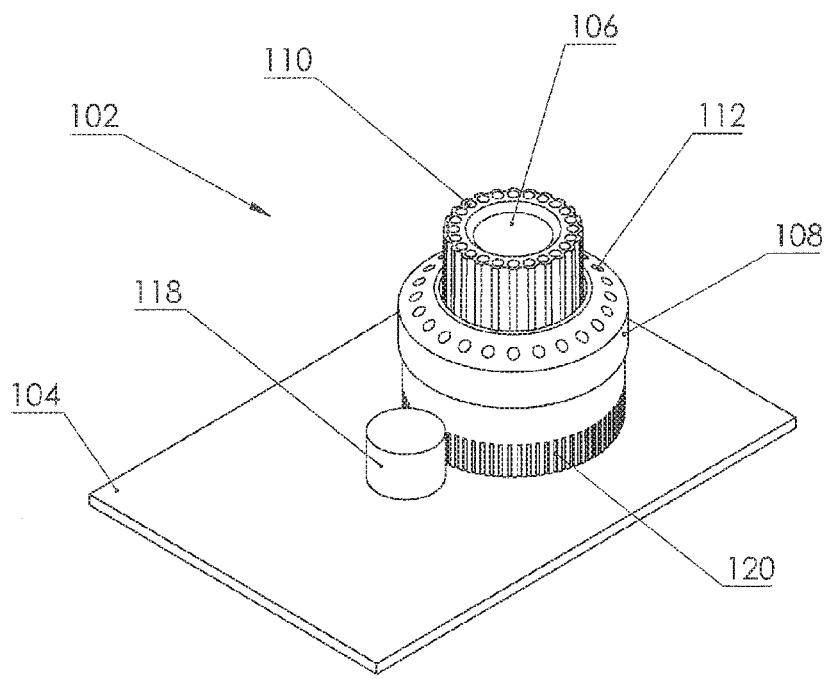
FIG. 8 illustrates a perspective view of the second embodiment of the rotary control of the invention shown in FIGS. 5 and 6.
Figure 9:
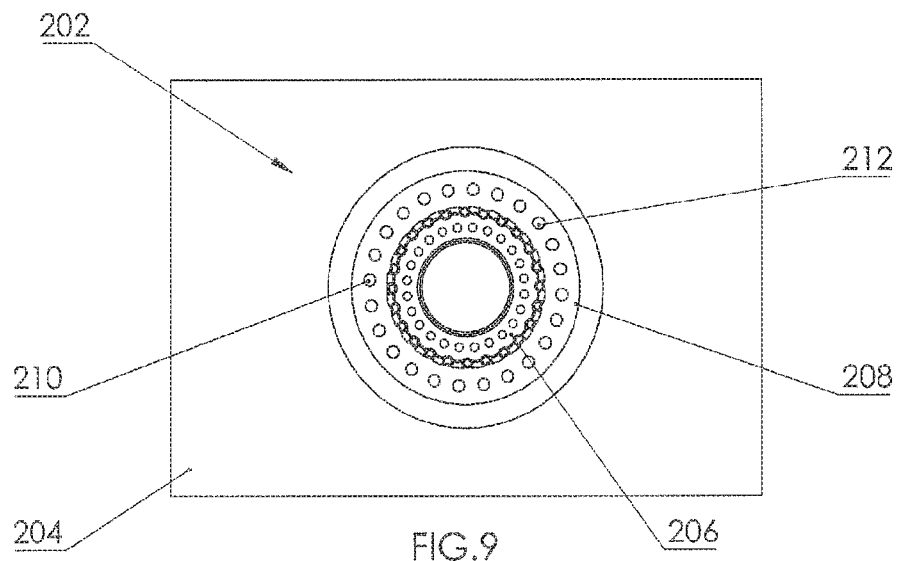
FIG. 9 illustrates a top down view of a third embodiment of a rotary control of the invention located on the surface of an apparatus.
Figure 10:
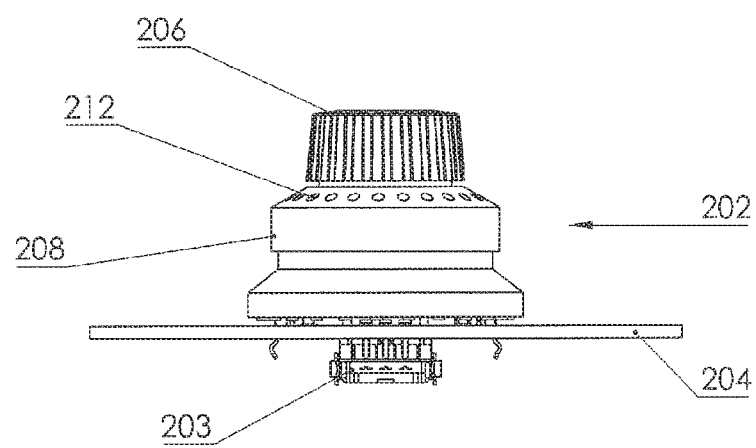
FIG. 10 illustrates a side view of the embodiment shown in FIG. 9.

The cylindrical knob (6) is connected to the surface (4) via a spindle (3) as shown in FIGS. 2 and 3. The annular knob (8) is connected to the surface (4) via a retaining sleeve (7) as shown in FIG. 3. The spindle (3) includes a reader (5) arranged to read the rotational position of the cylindrical knob (6) via any suitable means, connected to the inside surface of the cylindrical knob (6) such as a mechanical or optical encoder. The reader (5) is connected to suitable circuitry which reads the rotational position of the cylindrical knob (6) enabling the relevant parameter state to be transmitted electronically to the LEDs of the channels (10), which light emitting diodes produce signals transmitted by the optic fibres in channels (10). Electronic circuitry is disposed between the spindle (3) and the LEDs of the channels (10) so that a variety of operative states can be displayed by the fibre optics. For example, where the control position simply represents the volume of a particular sound source, that volume can be represented by the progressive illumination of diodes from a zero reference point so that a curved eliminated line of increasing or decreasing length is produced as the control is turned to increase or decrease the volume. Alternatively, the volume change may be indicated by the change in colour of each LED as the volume increases or decreases. Specific permutations of illuminated elements may be selected to represent specific operational conditions. For example, a castellated display, where every other diode is illuminated progressively can be used to indicate stereo gain for example.

The annular knob (8) includes a code strip (16) printed or engraved around the outside of the annular knob (8). The code strip (16) is arranged to operatively cooperate with an optical reader (14) adjacent to the annular knob (8), via suitable circuitry, so that as the annular knob (8) is rotated, the optical reader (14) reads signals from the code strip, and transmits said signals, corresponding to the state of the parameter being adjusted, to the LEDs located or associated with the channels (12). In this way, rotation of the annular knob (8), which causes a parameter change, sends information to the optical reader (14), which in turn transmits the information to the LEDs in or associated with the channels (12), so that the state of the relevant parameter can be displayed by the LEDs located within the channels (12).

In use, an operator may therefore rotate the cylindrical knob (6) and the annular knob (8) in order to change specific parameters, which change is then transmitted and displayed via the LEDs located within channels (10) and (12). In some examples, the parameters controlled by the cylindrical knob (6) and annular knob (8) are complementary, such as, for example coarse and fine control of volume or high-pass and low-pass filters of specific signals. In this way, a manufacturer of a music mixing desk or other equipment can ensure that parameters commonly adjusted together by an operator can be incorporated into the same rotary control. As the reader (5) located on spindle (3) and the corresponding encoder on the cylindrical knob (6) are located within the rotary control, this also saves valuable space on the music mixing desk or other equipment. In alternative embodiments to that shown in FIGS. 1 to 4 the optical encoder (14) (or any external encoder) connected with the outer annular knob (8) may also be located within or beneath the rotary control (2) in order to save further space.

Referring now to FIGS. 5 to 8, in a second embodiment of a rotary control (102) of the invention, the cylindrical knob (106), channels (110), annular knob (108), channels (112), surface (104), spindle (103), reader sleeve (105) and retaining ring (107) shown correspond to the same component as described for the embodiment of FIGS. 1-4, and their form and operation are identical.

In the embodiments shown in FIGS. 5-8, instead of an optical encoder and code strip, a gear-mesh (120) is provided around the outside of the base of the annular knob (108), and a corresponding mechanical reader (118) is located adjacent to the gear-mesh (120). In use, operation of the rotary control (102) is identical to that described for the embodiment shown in FIGS. 1-4, with the exception that the rotary position of the annular knob (108) is determined via the mechanical reader (118) meshing with the gear-mesh (120), which then effects transmission of signals via circuitry to the LEDs of the channels (112).

Referring now to FIGS. 9 to 12, in a third embodiment of a rotary control (202) of the invention, a cylindrical knob (206), channels (210), annular knob (208), channels (212), surface (204), spindle (203), spindle reader sleeve (205) and retaining ring (207) shown correspond to the same component as described for the embodiments of FIGS. 1-4 and 5-8, and their form and operation are substantially identical.

Figure 11:
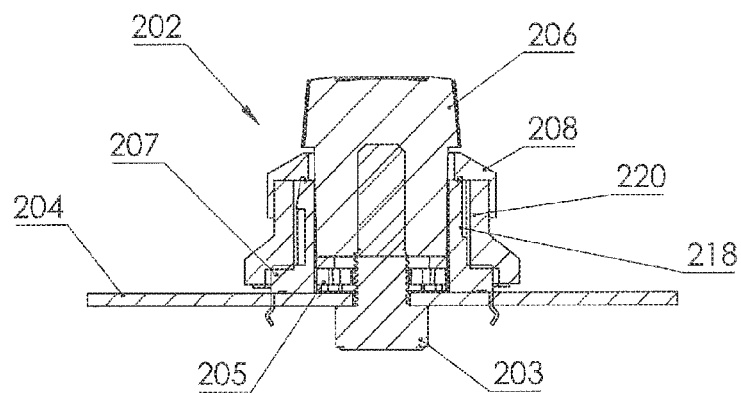
FIG. 11 illustrates a cross sectional view of the side view of FIG. 10.
Figure 12:
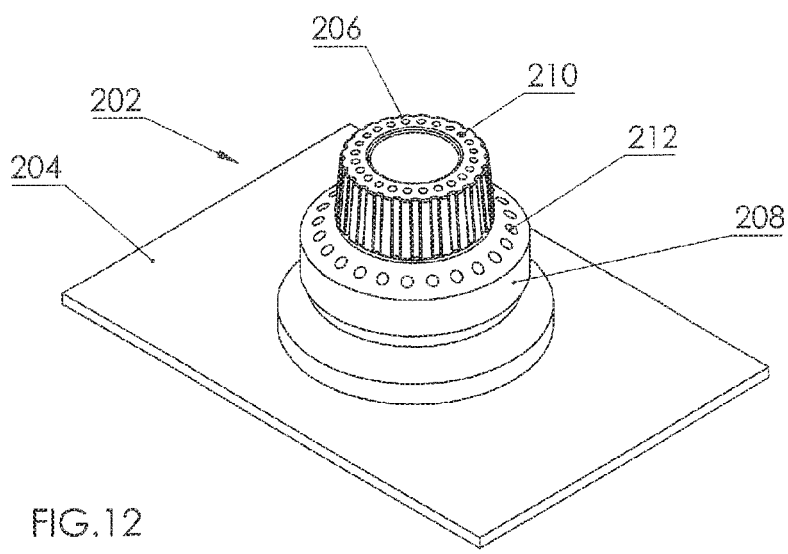
FIG. 12 illustrates a perspective view of the embodiment of the rotary control of the invention shown in FIGS. 9 and 10.

In the embodiments shown in FIGS. 9-12, instead of an optical or mechanical reader located external to the annular knob (208), the encoder and corresponding reader associated with the annular knob (208) are located within the rotary control (202). The encoder takes the form of an encoder ring (220) located on the inside of the surface of the annular knob (208), as shown in FIG. 11. A corresponding reader is located on the exterior surface of the retaining sleeve (207), in the form of a reader strip (218), as shown in FIG. 11. In use, operation of the rotary control (202) is identical to that described for the embodiment shown in FIG. 1-4 or 5-8, with the exception that the rotary position of the annular knob (208) is determined via the reader (218) reading corresponding signals from the optical encoder (220) on the inside of the annular knob (208). The reader then effects transmission of signals via the circuitry to the LEDs of the channels (212).

The embodiments shown in FIGS. 9-12 does not include any external components which further serves to minimise space on the surface (204) of the apparatus, and in addition minimises the risk of any one rotary control (202), malfunctioning due to obscuration of an external reader, by dust, or other foreign objects.

Figure 13:
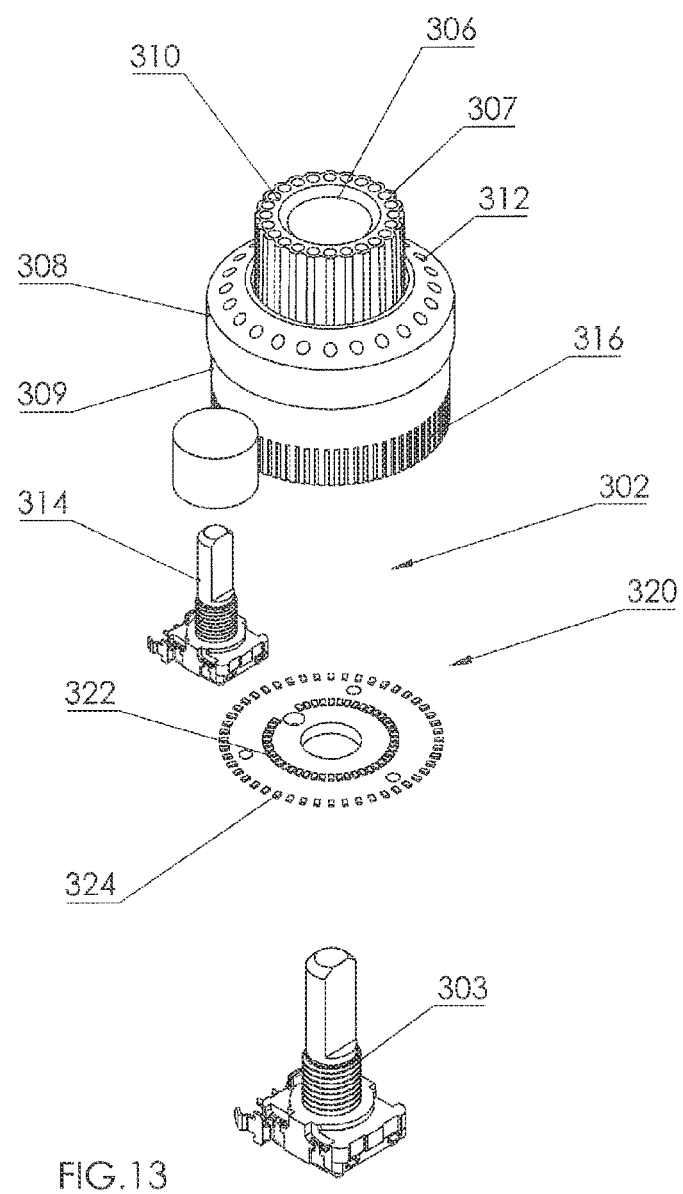
FIG. 13 illustrates an exploded view of a fourth embodiment of the rotary control of the invention.

Referring now to FIG. 13, in a fourth embodiment of a rotary control (302) of the invention, a cylindrical knob (306) and annular knob (308) shown correspond to the same component as described for the embodiments of FIGS. 1-4, 5-8, and 9-12, and their form and operation are substantially identical.

Channels (310, 312) again comprise optic fibres running therethrough however, the fibres are not connected to a single LED at an end thereof. Rather, the fourth embodiment of the rotary control (302) comprises an array of LEDs (320) arranged in a pair of concentric circles (322, 324). The cylindrical knob (306) and the annular knob (308) sit directly above the array (320), with the inner circle (322) corresponding to the channels (310) of the cylindrical knob (306), and the outer circle (324) corresponding to the channels (312) of the annular knob (308). In this embodiment, the cylindrical knob (306) and the annular knob (308) are rotatable with respect to the array of LEDs (320). In this way, the light from each of the LEDs making up the array (320) may at some point be transmitted through each of the channels (310, 312), depending on the position of the knobs (306, 308).

The rotary control (302) further includes a reader (303) arranged to read the rotational position of the cylindrical knob (306) via any suitable means, connected to the inside surface of the cylindrical knob (306) such as a mechanical or optical encoder. The reader (303) is connected to suitable circuitry which reads the rotational position of the cylindrical knob (306) enabling the relevant parameter state to be transmitted electronically to the LEDs of the inner circle (322) of the array (320), which light emitting diodes produce signals transmitted by the optic fibres in channels (310). Electronic circuitry is disposed between the reader (303) and the LEDs so that a variety of operative states can be displayed by the fibre optics.

The annular knob (308) includes a code strip (316) printed or engraved around the outside of the annular knob (308). The code strip (316) is arranged to operatively cooperate with an optical reader (314) adjacent to the annular knob (8), via suitable circuitry, so that as the annular knob (308) is rotated, the optical reader (314) reads signals from the code strip, and transmits said signals, corresponding to the state of the parameter being adjusted, to the LEDs on the outer circle (324) of the array (320). In this way, rotation of the annular knob (308), which causes a parameter change, sends information to the optical reader (314), which in turn transmits the information to the LEDs associated with the channels (312), so that the state of the relevant parameter can be displayed by the channels (312).

In addition to the above, both the cylindrical knob (306) and the annular knob (308) comprise respective surfaces (307, 309) which are touch sensitive. The touch sensitive surfaces (307, 309) are connected to suitable circuitry which enables the relevant parameter to be controlled without rotating the relevant knob (306, 308). The state of the relevant parameter controlled through the operation of the surfaces (307, 309) may also be transmitted electronically to the LEDs of the corresponding circle (322, 324) of the array (320) such that the state of the controllable parameters is displayed.

The rotary control (302) may further comprise a means to store the operational state or a series of operational states of each controllable parameter. In this way, the stored parameter settings or series of settings may subsequently be recalled without a user having to rotate each rotatable body (306, 308) or contact the touch sensitive surface/s (307, 309) to input each parameter setting individually to return to a desired setting. When recalling the stored parameter settings or series of settings, the rotary control (302) may further be operable to reactivate the corresponding LEDs.

The rotary control (302) may further comprise a microprocessor in communication with a remote computer. The controllable parameters and/or the operation of the visual display elements may be controlled by the microprocessor. The microprocessor may control the rotation of each rotatable body (306, 308) and/or the operation of the LEDs and may do so upon receipt of instructions from the remote computer.

The control of the parameters may be fully automated by the microprocessor and computer, for example, a user may input desired parameter settings directly to the computer and without the need to use the rotatable bodies (306, 308) of the rotary control (302). The computer may subsequently relay the user inputs to the microprocessor which controls the parameters through control of the rotation of the rotatable bodies (306, 308) and/or the operation of the LEDs.

The provision of touch sensitive surfaces (307, 309) on the rotatable bodies (306, 308) as illustrated in FIG. 13 affords additional benefits in embodiments wherein the parameter settings are controlled automatically by a microprocessor and a computer. During automation of the settings, a user may wish to override the computer to either adjust or turn on/off the parameter setting/s and/or LEDs. By providing touch sensitive surfaces (307, 309) on the rotatable bodies (306, 308) this allows for greater control over the parameter settings, even during automation. For example, activation of the or each touch sensitive surface (307, 309) may switch the rotary control (302) from being controlled by the remote computer, to being controlled by the user directly and vice versa. In other embodiments, the channels of the cylindrical knob (6, 106, 206, 306) may be replaced with a display formed from a matrix of light emitting elements within the top surface of the knob (6, 106, 206, 306), the matrix may be square or circular, or tailored to the shape the knob (6, 106, 206, 306). A display control is associated with the display. The matrix may comprise a plurality of light emitting diodes, liquid crystal display elements or pixels. These elements/pixels may be polygonal, for example hexagonal, as the image/knob may stop in any position. In one form the diodes or elements have an area of 0.3 mm$^2$ and spaced apart about 0.05 mm$^2$. An arrangement having a matrix, rather than an annular ring of light emitting elements enables the visual information displayed relating to a parameter to be in the form of numerals, letters, images or the like, which may be preferred by some operators.

In other embodiments, the channels located in both knobs (6, 106, 206, 306, 8, 108, 208, 308) may be replaced by a single appropriately positioned light emitting element or a plurality of light emitting elements, which change in response to a change in the relevant parameter, the change being a change in colour, brightness, or otherwise.

In an alternative embodiment, the rotatable bodies (306, 308) may be non-rotatable and changing each parameter may be achieved by touch-sensitive manipulation of the touch-sensitive surfaces (307, 309) alone. In these embodiments a user would move his or her finger across the touch-sensitive surfaces (307, 309) to actuate changes in the relevant parameters, and this movement would be transmitted to the visual display elements such as the corresponding circle (322, 324) of the array (320) to display the states of the controllable parameters.

The above embodiments are described by way of example only. Many variations are possible without departing from the scope of the invention as defined in the appended claims.

The invention claimed is:

1. A control comprising a cylindrical first touch-sensitive body comprising a first display element, the first display element adapted to display information relating to a parameter controlled by the first touch-sensitive body, and an annular second touch-sensitive body formed around a circumference of the first touch-sensitive body, the second touch-sensitive body comprising a second display element, the second display element adapted to display information relating to a parameter controlled by the second touch-sensitive body, wherein both the first touch-sensitive body and the second touch-sensitive body are rotatable.

2. The control as claimed in claim 1 wherein one or both of the first and second display elements comprises one or more visual display elements.

3. The control as claimed in claim 2 wherein at least one of the one or more visual display elements is connected to circuitry or other electrical means to enable selected elements to be activated to represent conditions associated with a parameter controlled by the first and/or second touch-sensitive body.

4. The control as claimed in claim 2 wherein at least one of the one or more visual display elements are connected to at least one information encoder and at least one corresponding information reader which together process information corresponding to the rotational position of the first and/or second bodies and relays said information to circuitry or other electronics to activate change in the parameter controlled by the first and/or second body and display the change via the one or more visual display elements.

5. The control as claimed in claim 4 wherein the at least one encoder and at least one reader are located on the outside of the first and/or second body or is located within the first and/or second body so that they are not visible during normal use of the control.

6. The control as claimed in claim 4 comprising a first encoder and a first reader for the first rotatable body located within the first rotatable body so that they are not visible during normal use of the control; a second encoder corresponding to the second rotatable body is located on an outside surface of the second body; and a second reader corresponding to the second rotatable body is located adjacent to the surface of the second body comprising the encoder.

7. The control as claimed in claim 1 wherein one or both of the the first and second display elements comprises a plurality of channels for the transmission of light signals.

8. The control as claimed in claim 1 wherein the first display element is formed within the first body, the second display element is formed within the second body, and the first and second display elements are adapted to display information relating to different parameters.

9. The control as claimed in claim 1 wherein the first display element is formed within the first body, the second display element is formed within the second body, and the first and second display elements are adapted to display information relating to a parameter controlled by both the first and second body.

* * * * *